(12) United States Patent
Portman

(10) Patent No.: US 12,154,301 B2
(45) Date of Patent: Nov. 26, 2024

(54) DIGITAL IMAGE ANALYSIS AND SELECTION

(71) Applicant: Zeta Global Corp., New York, NY (US)

(72) Inventor: Danny Portman, Atlanta, GA (US)

(73) Assignee: Zeta Global Corp., New York, NY (US)

( * ) Notice: Subject to any disclaimer, the term of this patent is extended or adjusted under 35 U.S.C. 154(b) by 335 days.

(21) Appl. No.: 17/452,199

(22) Filed: Oct. 25, 2021

(65) Prior Publication Data

US 2022/0130076 A1    Apr. 28, 2022

Related U.S. Application Data

(60) Provisional application No. 63/105,345, filed on Oct. 25, 2020.

(51) Int. Cl.
*G06T 9/00* (2006.01)
*G06F 18/214* (2023.01)
(Continued)

(52) U.S. Cl.
CPC ............ *G06T 9/002* (2013.01); *G06F 18/214* (2023.01); *G06F 18/22* (2023.01); *G06N 3/044* (2023.01);
(Continued)

(58) Field of Classification Search
None
See application file for complete search history.

(56) References Cited

U.S. PATENT DOCUMENTS 6,430,539 B1 *   8/2002   Lazarus .................. G06Q 30/02
                                              705/14.1
11,113,707 B1 *   9/2021   Sharma .............. G06Q 30/0205
                                        (Continued)

OTHER PUBLICATIONS

Petscharnig, Stefan, Mathias Lux, and Savvas Chatzichristofis. "Dimensionality reduction for image features using deep learning and autoencoders." Proceedings of the 15th international workshop on content-based multimedia indexing. 2017. (Year: 2017).*

(Continued)

*Primary Examiner* — Michelle M Entezari Hausmann
(74) *Attorney, Agent, or Firm* — Schwegman Lundberg & Woessner, P.A.

(57) ABSTRACT

In some examples, a computerized system for analyzing images comprises at least one programmable processor and a machine-readable medium having instructions stored thereon which, when executed by the at least one programmable processor, cause the at least one programmable processor to execute operations comprising training an autoencoder using a plurality of image model training samples, the autoencoder comprising a plurality of interconnected layers and combined instances of neural networks, passing input data into a trained autoencoder model, the input data including at least one pixel image, encoding the input data into a compressed version of the input data, and decoding the compressed version of the input data to generate to create an output, the output including a sparse reconstruction of the input data, the output including a predicted pixel image label or score.

20 Claims, 11 Drawing Sheets

(51) Int. Cl.
*G06F 18/22* (2023.01)
*G06N 3/044* (2023.01)
*G06N 3/045* (2023.01)
*G06N 3/047* (2023.01)
*G06N 3/088* (2023.01)

(52) U.S. Cl.
CPC .............. *G06N 3/045* (2023.01); *G06N 3/047* (2023.01); *G06N 3/088* (2013.01)

(56) References Cited

U.S. PATENT DOCUMENTS

| | | | |
|---|---|---|---|
| 11,961,111 B1* | 4/2024 | Sharma | G06Q 30/0242 |
| 2016/0239857 A1* | 8/2016 | Milton | G06Q 30/0201 |
| 2018/0011858 A1* | 1/2018 | Tekara Perrotta | G06F 16/24578 |
| 2018/0084988 A1* | 3/2018 | Chakravorty | A61B 5/7275 |
| 2018/0121953 A1* | 5/2018 | Zhang | G06Q 30/0254 |
| 2019/0251707 A1* | 8/2019 | Gupta | G06T 9/002 |
| 2020/0320571 A1* | 10/2020 | Singh | G06N 20/00 |
| 2020/0401916 A1* | 12/2020 | Rolfe | G06N 7/01 |
| 2021/0365614 A1* | 11/2021 | Sun | G06Q 50/04 |
| 2022/0051128 A1* | 2/2022 | Ristoski | G06Q 30/0202 |
| 2022/0198486 A1* | 6/2022 | Gin | G06N 3/006 |
| 2022/0351252 A1* | 11/2022 | Gerber | G06Q 30/0201 |

OTHER PUBLICATIONS

Jagadeesh, Vignesh, et al. "Large scale visual recommendations from street fashion images." Proceedings of the 20th ACM SIGKDD international conference on Knowledge discovery and data mining. 2014. (Year: 2014).*

Bi K, Qiu T, Huang Y. A deep learning method for yogurt preferences prediction using sensory attributes. Processes. Apr. 27, 2020;8(5):518. (Year: 2020).*

Comber S, Arribas-Bel D, Singleton A, Dolega L. Using convolutional autoencoders to extract visual features of leisure and retail environments. Landscape and Urban Planning. Oct. 1, 2020;202:103887. (Year: 2020).*

Liang, Huizhi, and Timothy Baldwin. "A probabilistic rating auto-encoder for personalized recommender systems." Proceedings of the 24th ACM International on conference on information and knowledge management. 2015. (Year: 2015).*

* cited by examiner

TRAINING DATA

DIGITAL IMAGE ANALYSIS AND SELECTION

TECHNICAL FIELD

The present disclosure to systems, architectures, and methods for digital image analysis and selection. Some examples relate to enhanced image placement and selection in online content.

CLAIM OF PRIORITY

This patent application claims the benefit of priority, under 35 U.S.C. Section 119(e), to Portman, U.S. Provisional Patent Application Ser. No. 63/105,345, entitled "ADVERTISEMENT CREATIVE IMAGE CLICK-THROUGH RATE PREDICTION", filed on Oct. 25, 2020, which is hereby incorporated by reference herein in its entirety.

BACKGROUND

The processing of large image files can impose a significant burden on bandwidth and computing resources. In situations in which the content of an image is intended to support a message or theme, futile processing of a large, uninspiring image can be particularly wasteful when it fails to engage a target audience. Examples in the present disclosure seek to address these challenges.

DETAILED DESCRIPTION

Figure 1:
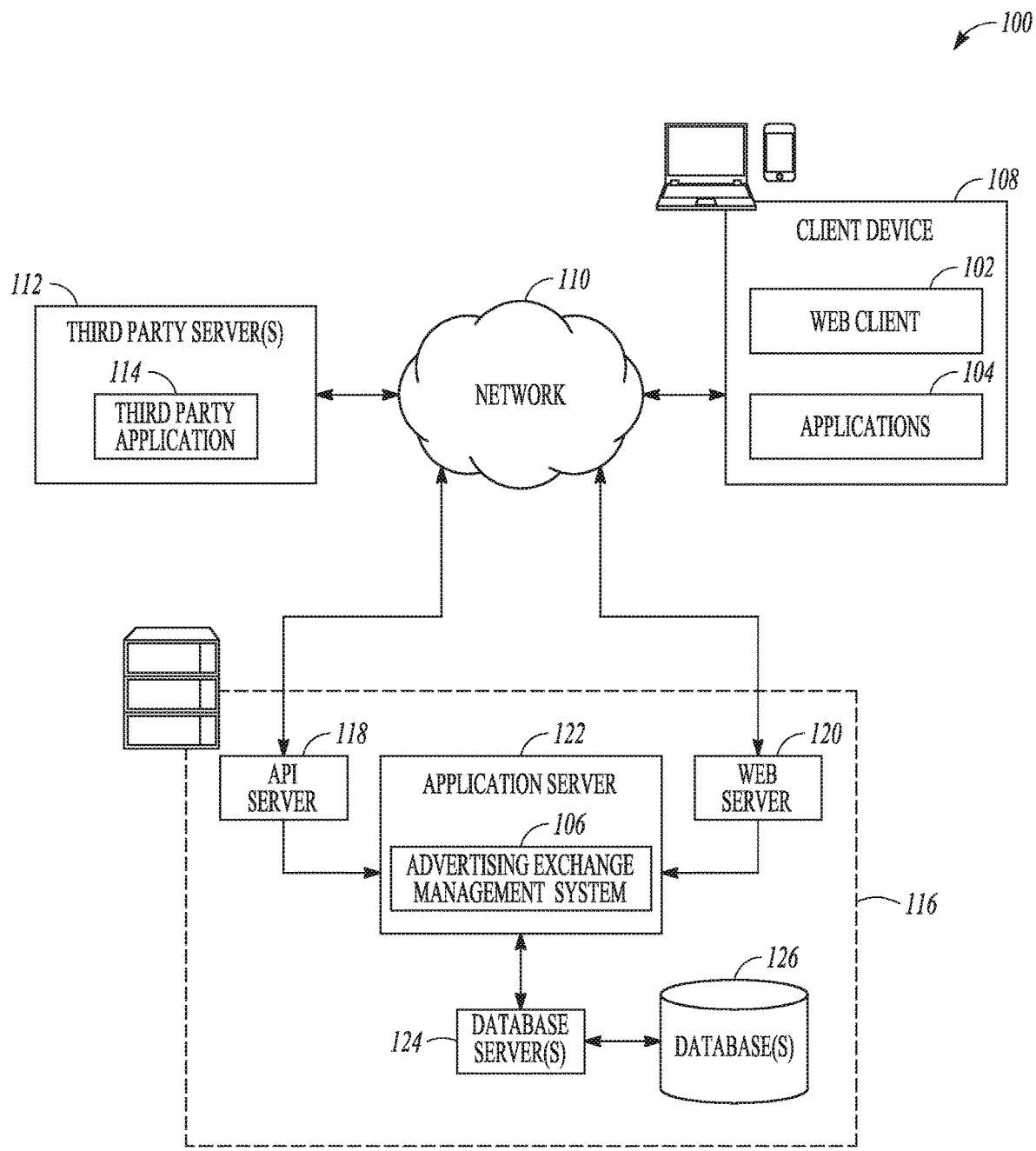
FIG. 1 is a block diagram illustrating a networked system according to an example embodiment.

The description that follows includes illustrative systems, methods, techniques, instruction sequences, and computing machine program products that embody illustrative embodiments. In the following description, for purposes of explanation, numerous specific details are set forth to provide an understanding of various embodiments of the inventive subject matter. It will be evident, however, to those skilled in the art that embodiments of the inventive subject matter can be practiced without these specific details. In general, well-known instruction instances, protocols, structures, and techniques have not been shown in detail, should also be understood b those with skill in the art may combine elements from various embodiments in practicing the present invention.

Systems and methods in accordance with the disclosure herein use machine learning to identify expanded audiences based on seeded ideal audiences for a publisher or advertiser in near real time.

In this manner, the system is comprised of training routines for a deep autoencoder model, a procedure and system which uses the trained autoencoder to transform a large dataset of text-based customer representations into a more useful representation, and an algorithm for audience expansion using the representations generated by the model.

In general, "INVENTORY" in this context may be a term for a unit of advertising space, such as a magazine page, television airtime, direct mail message, email messages, text messages, telephone calls, etc. Advertising inventory may be advertisements a publisher has available to sell to an advertiser. In certain embodiments, advertising inventory may refer to a number of email advertisements being bought and/or sold. The terms INVENTORY and. ADVERTISING INVENTORY may be used interchangeably. For email marketing campaigns, advertising inventory is typically an email message.

A "PUBLISHER" in this context may be an entity that sells advertising inventory, such as those produced by the systems and methods herein, to their email subscriber database. An advertiser may be a buyer of publisher email inventory. Examples of advertisers may include various retailers. A marketplace may allow advertisers and publishers to buy and sell advertising inventory. Marketplaces, also called exchanges or networks, may be used to sell display, video, and mobile inventory. In certain embodiments, a marketplace may be an email exchange/email marketplace. An email exchange may be a type of marketplace that facilitates buying and/or selling of inventory between advertisers and publishers. This inventory may be characterized based on customer attributes used in marketing campaigns. Therefore, an email exchange may have inventory that can be queried by each advertiser. This may increase efficiency of advertisers when purchasing inventory. A private network may be a marketplace that has more control and requirements for participation by both advertisers and publishers.

An "INDIVIDUAL RECORD" or "PROSPECT" in this context may be at least one identifier of a target. In certain embodiments, the individual record/prospect may be identified by a record identification mechanism, such as a specific email address (individual or household) that receives an email message.

An "AUDIENCE" in this context may be a group of records, which may be purchased as inventory. In certain embodiments, an audience may be a group of records selected from publisher databases of available records such as a group of consumers and their affiliated profiles. The subset of selected records may adhere to a predetermined set of criteria, such as common age range, common shopping habits, and/or similar lifestyle situation (i.e., stay-at-home mother) Advertisers generally select the predetermined set of criteria when they are making an inventory purchase.

"CARRIER SIGNAL" in this context in this context refers to any intangible medium that is capable of storing, encoding, or carrying instructions for execution by a machine, and includes digital or analog communications signals or other intangible media to facilitate communication of such instructions. Instructions may be transmitted or received over a network using a transmission medium via a network interface device using an appropriate transfer protocol.

"CLIENT DEVICE" in this context refers to any machine that interfaces with a communications network to obtain resources from one or more server systems or other client devices. A client device may be, but is not limited to, a mobile phone, desktop computer, laptop, portable digital assistant (PDA), smart phone, tablet, ultra-book., netbook, laptop, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling of the client device to the network may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, 5G, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"COMPONENT" in this context refers to a device, a physical entity, or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "HARDWARE COMPONENT" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired) or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output Hardware components may also initiate communications with input or output devices, and can operate on a resource (e.g., a collection of information).

The various operations of example methods described herein may be performed, at least partially by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"MACHINE-READABLE MEDIUM" in this context refers to a component, a device, or other tangible media able to store instructions and data temporarily or permanently, and may include, but not be limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein—Accordingly, a "machine-readable medium" refers to a single storage apparatus or device, as well as "cloud-based" storage systems or storage networks that include multiple storage apparatus or devices. The term "machine-readable medium" excludes signals per se.

"PROCESSOR" in this context refers to any circuit virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

At a high level, in some examples a computerized system for analyzing images comprises at least one programmable processor; and a machine-readable medium having instructions stored thereon which, when executed by the at least one programmable processor, cause the at least one programmable processor to execute operations comprising: training an autoencoder using a plurality of image model training samples, the autoencoder comprising a plurality of interconnected layers and combined instances of neural networks; passing input data into a trained autoencoder model, the input data including at least one pixel image; encoding the received input data into a compressed version of the input data; decoding the compressed version of the input data to generate to create an output, the output including a sparse reconstruction of the input data, the output including a predicted pixel image label or score.

In some examples, the operations further comprise, during the encoding operation or the decoding operation, reducing a dimensionality of the input data passed into the trained autoencoder.

In some examples, the interconnected layers include an input layer to receive the input data, and an output layer to generate the output, the input layer and the output layer having a same number of nodes.

in some examples, the combined instances of the neural networks include a Restricted Boltzmann Machine (RBM), and wherein training the autoencoder includes training the RBM using contrast divergence.

In some examples, the operations further comprise generating a creative profile including the predicted image label or score.

In some examples, the operations further comprise comparing the predicted pixel image label or score against historical image performance of similar pixel images. The use of the term pixel in this specification is intended to include within its ambit a digital image.

More detailed aspects of some examples are now described. With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of an application 104, are hosted and execute on the client device 108. The networked system 116 includes an application server 122, which in turn hosts an advertising exchange management system 106 for management of an advertising exchange using email data according to one embodiment. The advertising exchange management system 106 provides a number of functions and services to the application 104 that accesses the networked system 116. The application 104 also provides a number of interfaces described herein, which present output of tracking and analysis opera lions to a user of the client device 108.

The client device 108 enables a user to access and interact with the networked system 116. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An Application Program Interface (API) server 118 and a web server 120 are coupled, and provide programmatic and web interfaces respectively, to the application server 122. The application server 122 hosts the advertising exchange management system 106, which includes components or applications. The application server 122 is, in turn, shown to be coupled to a database server 124 that facilitates access to information storage repositories (e.g., a database 126). In an example embodiment, the database 126 includes storage devices that store information accessed and generated by the advertising exchange management system 106.

Additionally, a third-party application 114, executing on a third-party server(s) 112, is shown as having programmatic access to the networked system 116 via the programmatic interface provided by the APT server 118. For example, the third-party application 114, using information retrieved from the networked system 116, may support one or more features or functions on a website hosted by a third party.

Turning now specifically to the applications hosted by the client device 108, the web client 102 may access the various systems (e.g., advertising exchange management system 106) via the web interface supported by the web server 120. Similarly, the application 104 (e.g., an "app") accesses the various services and functions provided by the advertising exchange management system 106 via the programmatic interface provided by the API server 118. The application 104 may be, for example, an "app" executing on the client device 108, such as an IOS™ or ANDROID™ OS application to enable a user to access and input data on the networked system 116 in an offline manner, and to perform batch-mode communications between the application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The advertising exchange management system 106 could also be implemented as a standalone software program, which does not necessarily have networking capabilities.

Figure 2:
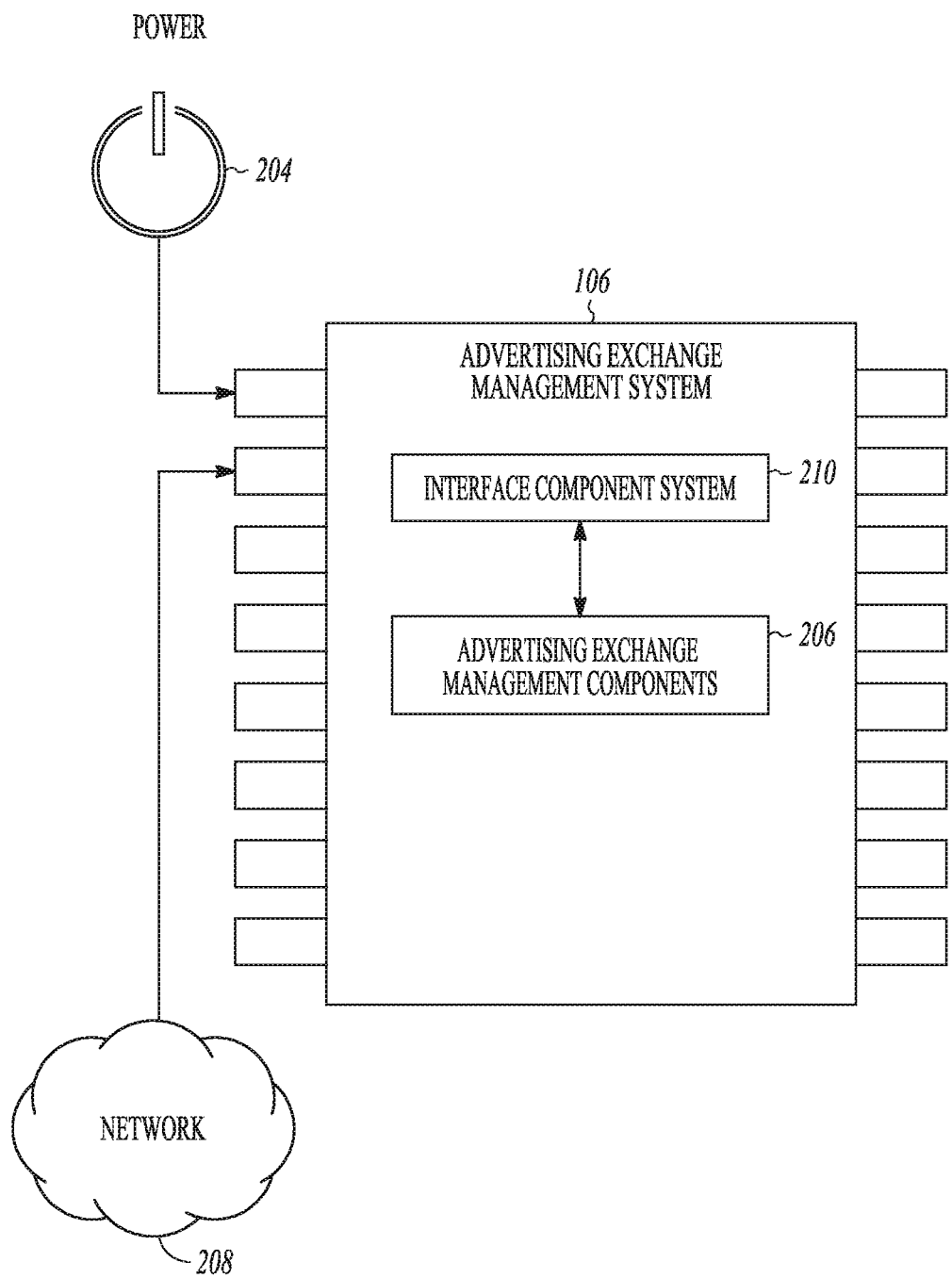
FIG. 2 is a block diagram showing architectural details of the networked system according to some example embodiments.

FIG. 2 is a block diagram showing architectural details of an advertising exchange management system 106, according to some example embodiments. Specifically, the advertising exchange management system 106 is shown to include an interface component 210 by which the advertising exchange management system 106 communicates (e.g., over a network 208) with other systems within the SaaS network architecture 100.

The interface component 210 is collectively coupled to one or more advertising exchange management components 206 that operate to provide specific aspects of management of an advertising exchange using email data, in accordance with the methods described further below with reference to the accompanying drawings.

Figure 3:
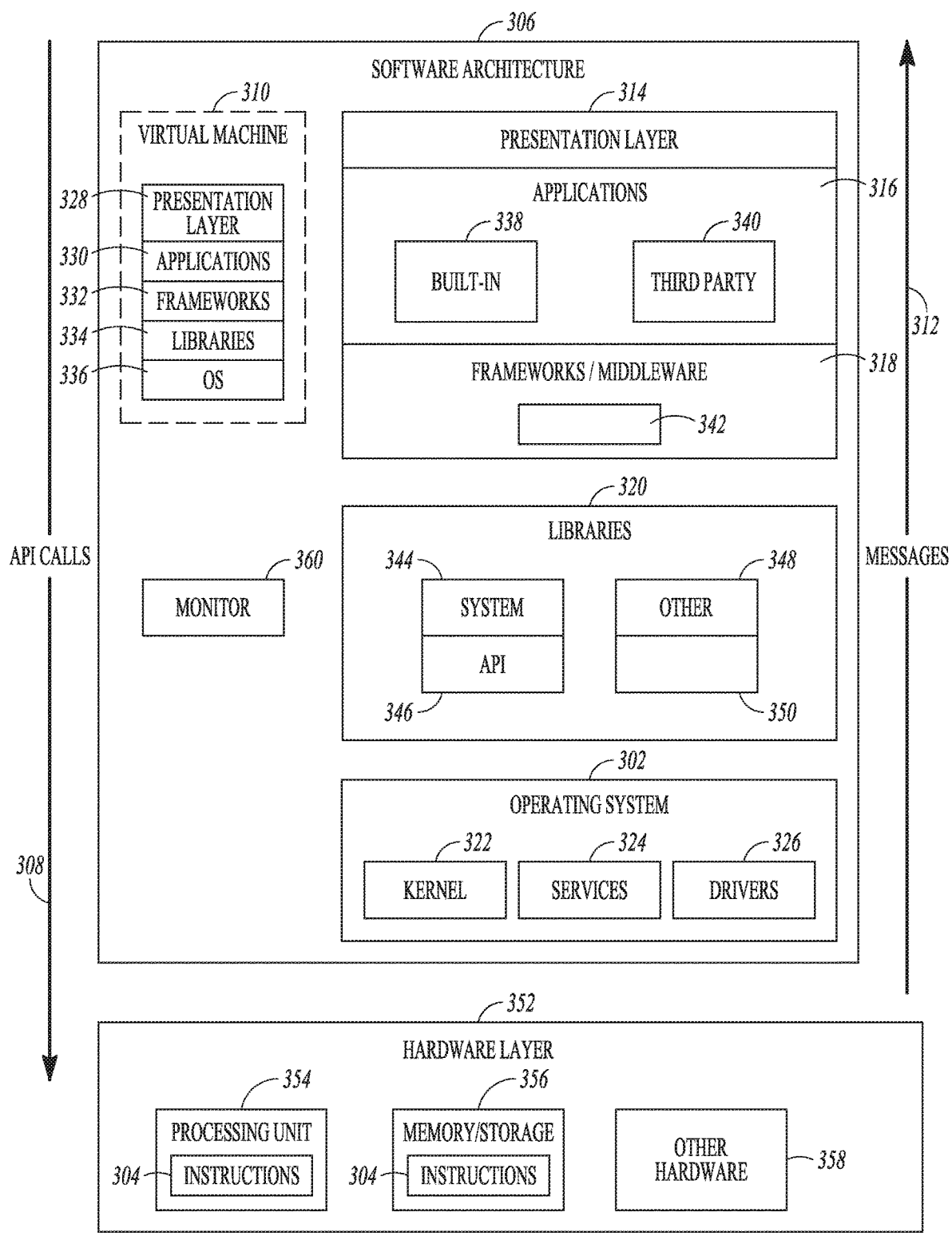
FIG. 3 is a block diagram illustrating a representative software architecture which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306 and it will be appreciated that many other architectures may be implemented to facilitate the functionality described herein. The software architecture 306 may execute on hardware such as a machine 400 of FIG. 4 that includes, among other things, processors 404, memory/storage 406, and I/O components 418. A representative hardware layer 352 is illustrated and can represent for example, the machine 400 of FIG. 4. The representative hardware layer 352 includes a processing unit 354 having associated executable instructions 304. The instructions 304 represent the instructions 304 of the software architecture 306, including implementation of the methods, components, and so forth described herein. The hardware layer 352 also includes memory and/or storage modules as memory/storage 356, which also have the instructions 304. The hardware layer 352 may also comprise other hardware 358.

In the example architecture of FIG-. 3, the software architecture 306 may be conceptualized as a slack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke application programming interface (API) API calls 308 through the software stack and receive messages 312 in response to the API calls 308. The layers illustrated are representative in nature, and not all software architectures have all layers. For example, some mobile or special-purpose operating systems may not provide a frameworks/middleware 318, while others may, provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include APT libraries 346 such as media libraries (e.g., libraries to support presentation and manipulation of various media formats such as MPEG4, H264, MP3, AAC, AMR, JPG, and PNG), graphics libraries (e.g., an OpenGL framework that may be used to render 2D and 3D graphic content on a display); database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 (also sometimes referred to as middleware) provide a higher-level common infrastructure that may be used by the applications 316 and/or other software components/modules. For example, the frameworks/middleware 318 may provide various graphic user interface (GUI) functions, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application a browser application, a book reader application, a location application, a media application, a messaging application, and/or a game application. The third-party applications 340 may include any application developed using the ANDROI™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (operating system 302 in FIG. 3) and typically, although not always, has a virtual machine monitor 360, which manages the operation of the virtual machine 310 as well as the interface with the host operating system (i.e., operating system 302). A software architecture executes within the virtual machine 310, such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
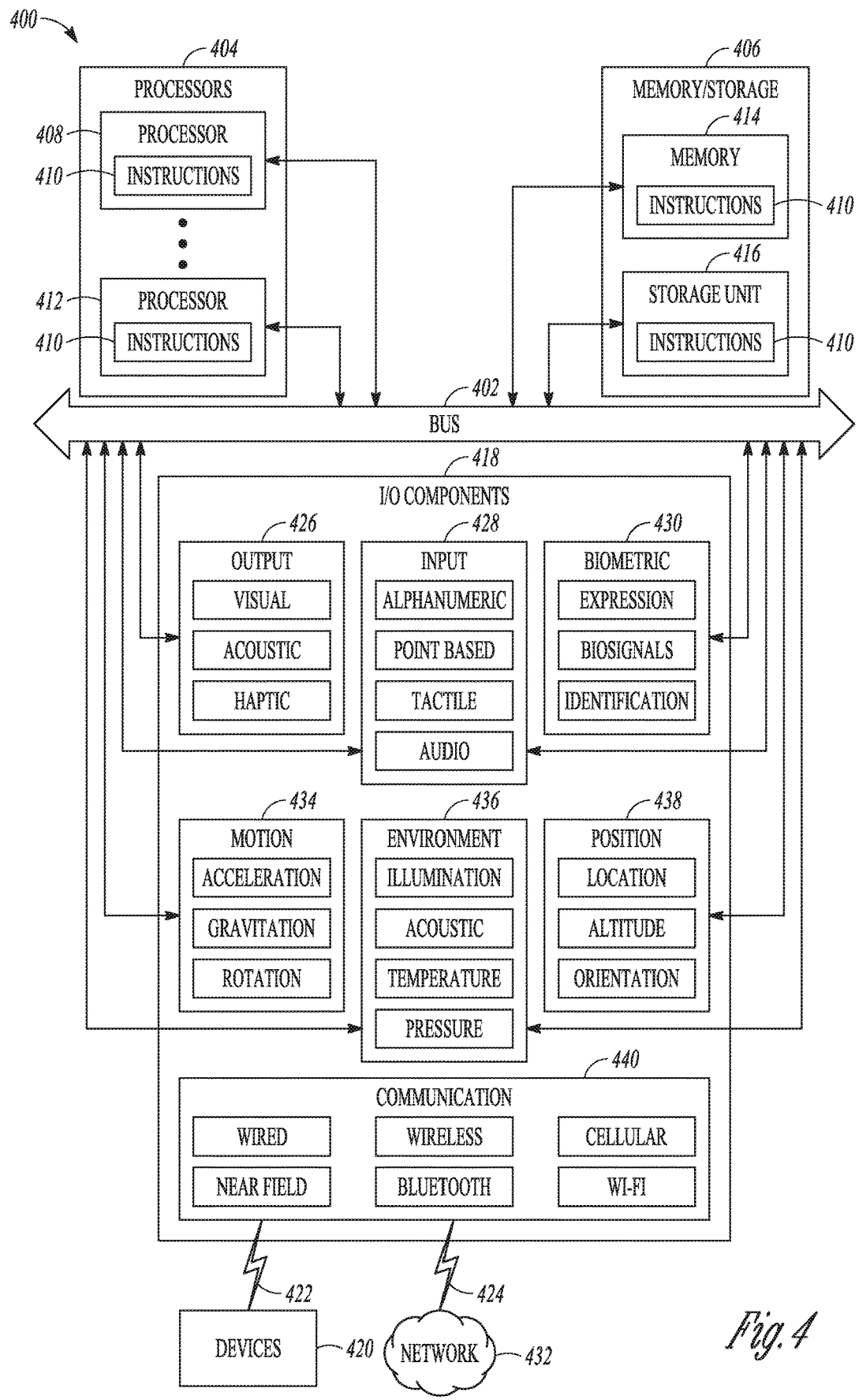
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an apples, an app, or other executable code) for causing the machine 400 to perform any one or more of the methodologies discussed herein may be executed. As such, the instructions 410 may be used to implement modules or components described herein. The instructions 410 transform the general, non-programmed machine into a particular machine programmed to carry out the specific described and illustrated functions in the manner described.

In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404, memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, dining execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion and the grouping is in no way limiting. In various example embodiments, the I/O components 418 may include output components 426 and input components 428. The output components 426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the UO components 418 may include biometric components 430, motion components 434, environment components 436, or position components 438 among a wide array of other components. For example, the biometric components 430 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature immunity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The UO components 418 may include communication components 440 operable to couple the machine 400 to a network 432 or devices 420 via a coupling 424 and a coupling 422 respectively. For example, the communication components 440 may include a network interface component or another suitable device to interface with the network 432. In further examples, the communication components 440 may include wired communication components, wireless communication components, cellular communication components, Near Field Communication (NFC) components, Bluetooth® components (e.g., Bluetooth®) Low Energy), Wi-Fi® components, and other communication components to provide communication via other modalities. The devices 420 may be another machine or any of a wide variety of peripheral devices (e.g., a peripheral device coupled via a USB), Moreover, the communication components 440 may detect identifier, or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geolocation, location via Wi-Fi® signal triangulation, location via detecting an NFC beacon signal that may indicate a particular location, and so forth.

In this example, the systems and methods are described in the general context of computer program instructions executed by one or more computing devices that can take the form of a traditional server/desktop/laptop; mobile device such as a smartphone or tablet, etc. Computing devices typically include one or more processors coupled to data storage for computer program modules and data. Key technologies include, but are not limited to, the multi-industry standards of Microsoft and Linux/Unix based Operating Systems; databases such as SQL Server, Oracle, NOSQL, and DB2; Business Analytic/Intelligence tools such as SPSS, Cognos, SAS, etc.; development tools such as Java, .NET Framework (VB.NET, ASP.NET, AJAX.NET, etc.); and other e-commerce products, computer languages, and development tools. Such program modules generally include computer program instructions such as routines, programs, objects, components, etc., for execution by the one or more processors to perform particular tasks, utilize data, data structures, and/or implement particular abstract data types. While the systems, methods, and apparatus are described in the foregoing context, acts and operations described hereinafter may also be implemented in hardware.

Figure 5:
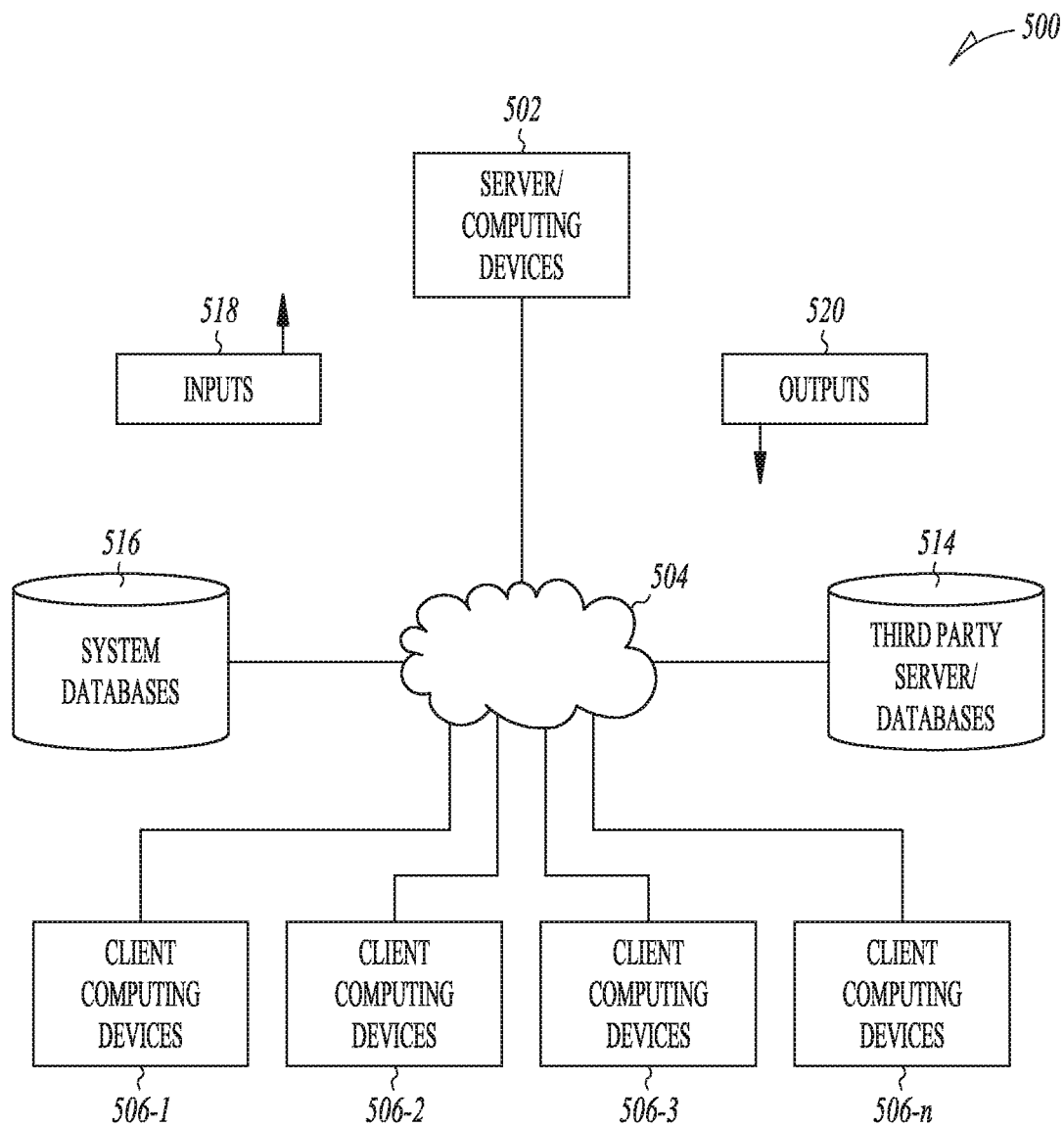
FIG. 5 is a block diagram illustrating another exemplary system for managing consumer data.

FIG. 5 shows a block diagram of another exemplary system 500 for management of an advertising exchange using email data according to one embodiment. In this exemplary implementation system 500 may include one or more servers/computing devices 502 (e.g., server 1, server 2, . . . , server n) operatively coupled over network 504 to one or more client computing devices 506-1 to 506-n, -which may include one or more consumer computing devices, one or more provider computing devices, one or more remote access devices, etc. The one or more servers/computing devices 502 may also be operatively connected, such as over a network 504, to one or more third-party servers/databases 514 (e.g., database 1, database 2, . . . , database n). The one or more servers/computing devices 502 may also be operatively connected, such as over a network 504, to one or more system databases 516 (e.g., database 1, database 2, . . . , database n). Various devices may be connected to the system 500, including, but not limited to, client computing devices, consumer computing devices, provider computing devices, remote access devices, etc. The system 500 may receive inputs 518 and outputs 520 from the various computing devices, servers, and databases.

Server/computing device 502 may represent, for example, any one or more of a server, a general-purpose computing device such as a server, a personal computer (PC), a laptop, a smart phone, a tablet, and/or so on. Networks 504 represent, for example, any combination of the Internet, local area network(s) such as an intranet, wide area network(s), cellular networks, WiFi networks, and/or so on. Such networking environments are commonplace in offices, enterprise-wide computer networks, etc. Client computing devices 506, which may include at least one processor, represent a set of arbitrary computing devices executing application(s) that respectively send data inputs to server/computing device 502 and/or receive data outputs from server/computing device 502. Such computing devices include, for example, one or more of desktop computers, laptops, mobile computing devices (e.g., tablets, smart phones, human-wearable device), server computers, and/or so on. In this implementation, the input data comprises, for example, real-time campaign data, audience profile, attribution data, and/or so on, for processing with server/computing device 502. In one implementation, the data outputs include, for example, emails, templates, forms, and/or so on. Embodiments of the present disclosure may also be used for collaborative projects with multiple users logging in and performing various operations on a data project from various locations. Embodiments of the present disclosure may be web-based, smart phone-based and/or tablet-based or human-wearable device based.

To this exemplary implementation, server/computing device 502 includes at least one processor coupled to a system memory. System memory may include computer program modules and program data.

Figure 6:
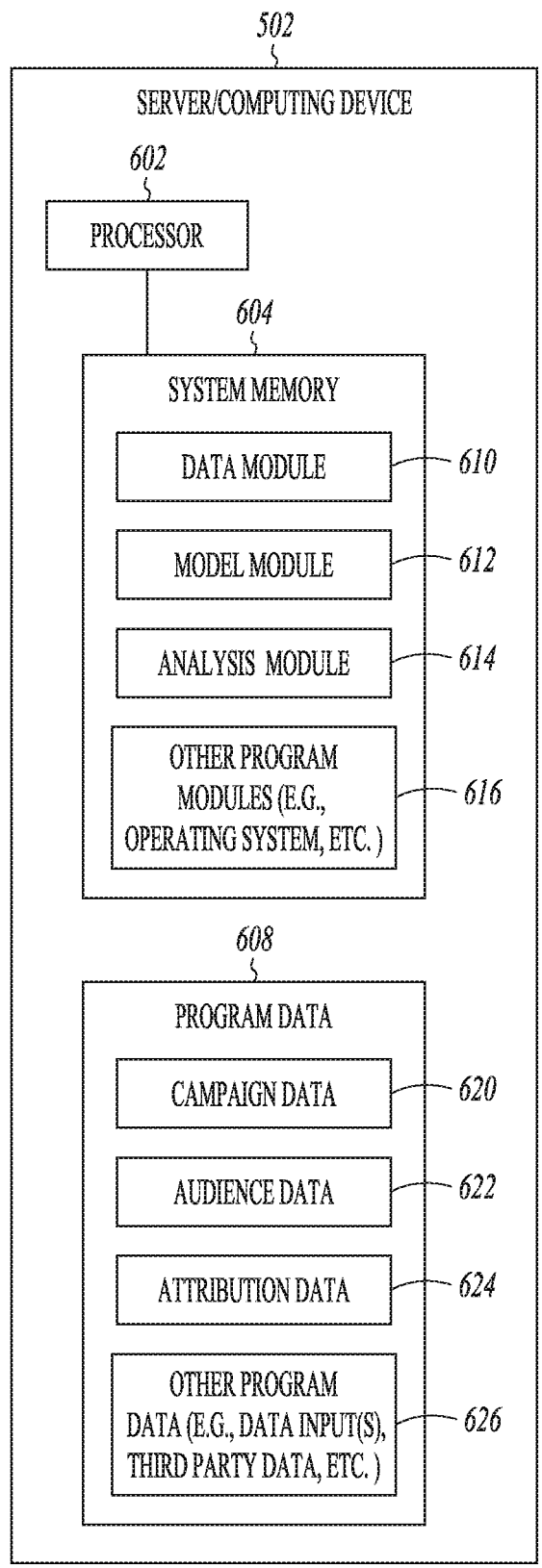
FIG. 6 is a block diagram illustrating an example for computational aspects for managing consumer data.

In this exemplary implementation, server/computing device 502 includes at least one processor 602 coupled to a system memory 604, as shown by the block diagram in FIG. 6. System memory 604 may include computer program modules 606 and program data 608. In this implementation program modules 606 may include data module 610, model module 612, analysis module 614, and other program modules 616 such as an operating system, device drivers, etc. Each module 610 through 616 may include a respective set of computer-program instructions executable by processor(s) 602. This is one example of a set of program modules, and other numbers and arrangements of program modules are contemplated as a function of the particular arbitrary design and/or architecture of server/computing device 502 and/or system 500 (FIG. 5). Additionally, although shown on a single server/computing device 502, the operations associated with respective computer-program instructions in the program modules 606 could be distributed across multiple computing devices. Program data 608 may include campaign data 620, audience data 622, attribution data 624, and other program data 626 such as data input(s), third-party data, and/or others.

Figure 9:
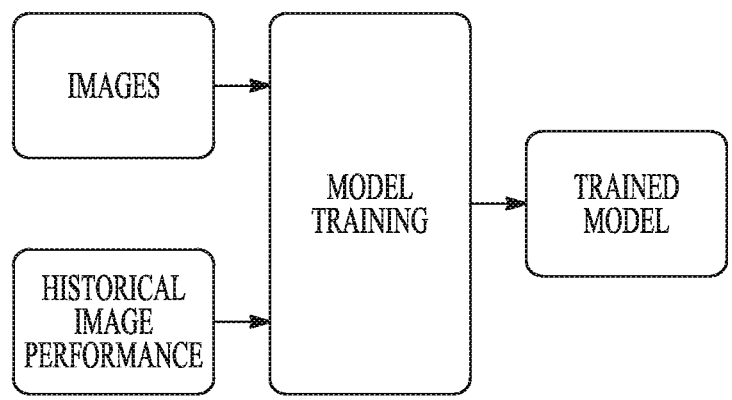
FIGS. 9-12 are architecture block diagrams in accordance with some example embodiments.
Figure 10:
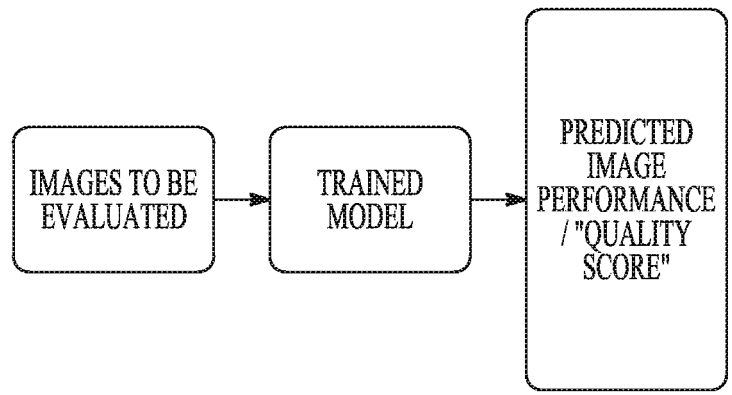

In some examples, predicting the effectiveness of the creative content ("creative") in an ad placement can reduce the number of times a marketer is required to transmit images to an end consumer. In some examples, gains in effectiveness are sought by running images and their historical performance through a training model as illustrated in FIG. 9 in order to create a trained model. In some examples, the model training may be based on past conversions, mouse-over, views, or click-through responses for specific ads including factoring the specific demographics of various target audiences. The images are then run through a trained model as illustrated in FIG. 10 to be assigned a predictive image/performance quality score.

Figure 11:
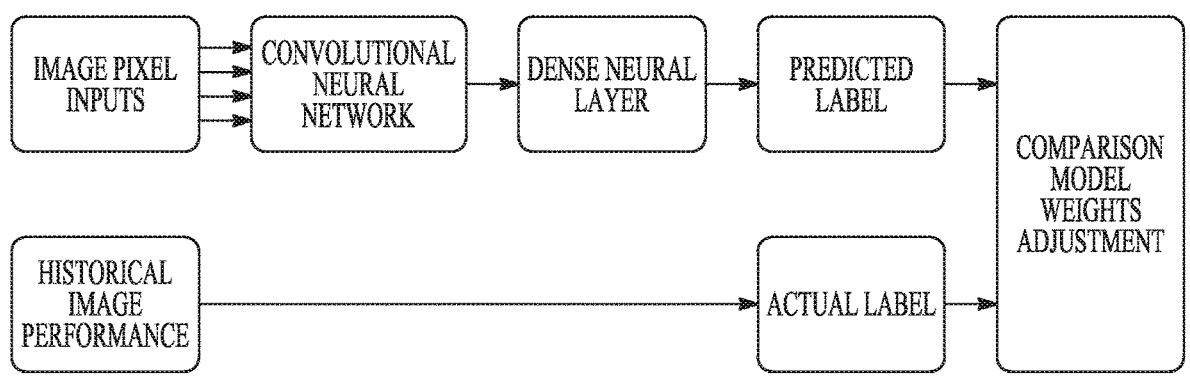
Figure 12:
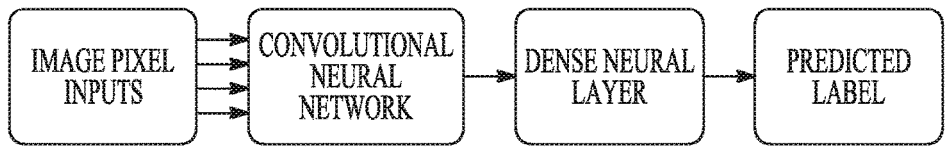

A deep learning model architecture training is illustrated in FIG. 11. The model learns by taking pixel image inputs running through a convolutional neural network, then through a dense neural layer, to create a predicted label. This predicted label is compared against historical image performance of similar pixel images to compare model weights and to suggest adjustments or optimizations in aspects such as image attributes, labelling, placement, and presentation. In some examples, a predicted label may also be derived from serving data used in a deep learning model architecture training is illustrated in FIG. 12.

Figure 7:
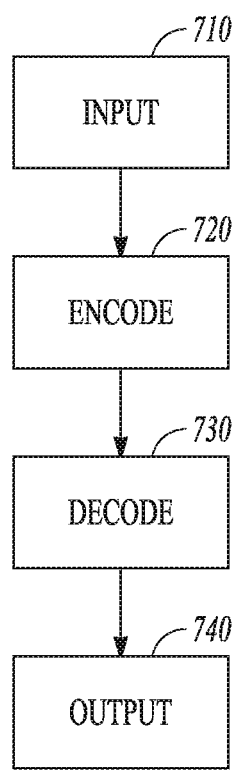
FIG. 7 is a block diagram of a system according to example embodiments.

As shown in FIG. 7, the neural network system may take an input (input data) 710, encode the input into a compressed version via an encode process 720. Then decode the compressed version via a decoder process 730 to create an output 740. The output 740 is intended to be a sparse reconstruction of the input data 710. The output layer and input layer ideally have the same number of nodes.

In some examples, the dimensionality of the input data 710 passed into the encoder 720 is reduced, for example in the encoding or decoding phases. Reducing dimensionality may help reduce the memory required while suffering minor losses in fidelity and allow for lower bandwidth usage. Once trained, the reduction allows for targeted values and faster processing of comparison in order to achieve consumer audience expansion. Although FIG. 7 depicts a single encode level, in some examples, there are multiple encoders. At each encode level, the encoded data becomes increasingly summarized/abstracted. Decode layers) reconstruct the original data symmetric with the encode layer(s).

Figure 8:
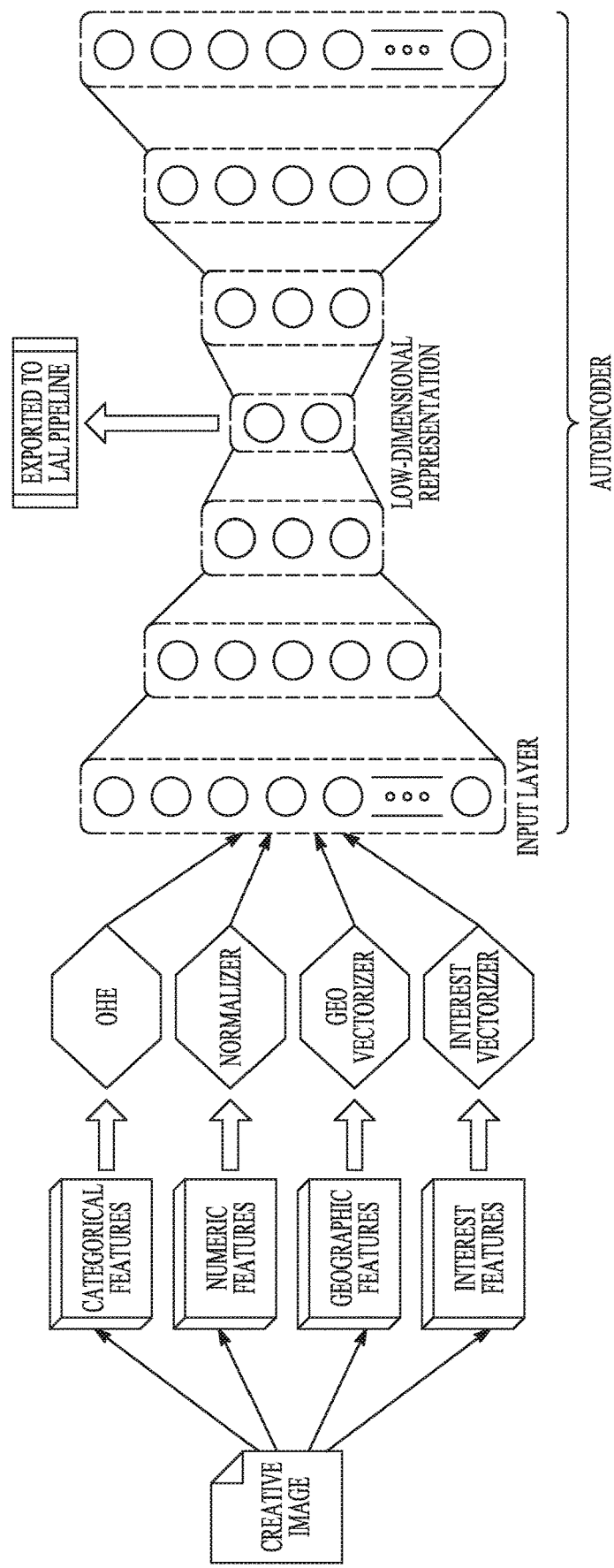
FIG. 8 is a block diagram of a system for encoding creative images according to some example embodiments.

For example, FIG. 8 depicts a representation of a structure of an autoencoder. An example structure, as illustrated, has five layers. Every layer in the network is connected with adjacent layers. In some examples in practice there may be more or fewer layers. The autoencoder may further comprise combining instances of neural networks such as a Restricted Boltzmann Machine (RBM). Training of the autoencoder may be performed through backpropagation of an error, or any other method used to train a feedfoward neural network. In some examples, the auto encoder uses neural networks to solve classification problems and hidden layers to build questions. The RBM produces a set of weights between the neural units such that hidden layers reconstruct training vectors with high probability in the visible layer.

One method for training the RBM is contrast divergence (CD). Each iteration of contrast divergence is divided into positive and negative phases. In the positive phase, the visible layer's state is set to the same state as that of a training vector (important consumer characteristics forming a profile). Then, according to the weight matrix describing the connection strengths between neural units, the hidden layer's state is stochastically determined. The algorithm records the resulting states of the hidden units in this positive phase. Next, in the negative phase, the hidden layer's states and the weight matrix stochastically determine the states of the visible layer. From there, the network uses the visible layer to determine the final state of the hidden units.

Once the first RBM is trained using the CD method, all the training vectors are shown to the RBM once more and record the resulting hidden unit states are recorded corresponding to each vector. Then the next RBM in the "state" can be moved to within the autoencoder and to the hidden states are used as input vectors into the new RBM, beginning the process anew. From there the new RBM is trained, new hidden states are gathered, and the next RBM in line is trained. Once all RBMs in the autoencoder have been trained, the process of standard gradient descent using backpropagation begins. Normally, gradient descent requires labels to successfully backpropagate error, which implies supervised training. However, due to the function and structure of the autoencoder, the data labels happen to be the data itself. In some examples, the system uses these neural networks to generate approximations of image characteristics including parsing text and image components. The input is typically a combination of image as collective creative. The creative properties are stored in an identify graph.

FIG. 8 shows a representation of an example embodiment of one creative image being run through the neural networks as disclosed. The system encodes and decodes the creative identity graph to create a sparse approximation of the image. The customer profile contains collected information about each creative. In this way, a creative profile contains a number of creative property vectors. In FIG. 8, the creative profile is shown to have categorical features, numeric features, geographic features, and interest features, but in some examples that the creative profile may have any number or type of categories that pertain to the creative.

Each of the vectors is run through an individualized program to prepare for the creative pixel input layer. The categorical features are run through an OHE, the numeric features are run through a normalizer, the geographic features are run through a geo vectorizer, and the interest features are run through an interest vectorizer. The output of each of these forms the input layer.

The system encodes the input layer and has a plurality of hidden layers. At the most encoded layer, the system creates a low-dimensional representation which is exported to a pipeline. The low-dimensional representation of the customer profile vector is then run through equal decoder layers to reach the output layer equal in nodes to the input layer.

In some examples, the image pixel input process includes means of extracting visual features and text of an image using an artificial intelligence technique in order to compare that image with the historic performance of like images, in some examples, the learning model may further refine the classification of the pixel images on input or the classification of the images for a number of characteristics.

In some examples, when selecting ad creative to put in the placement, the available creative options pixels are parsed for image characteristics through the image pixel input which then runs through the convolutional neural network and then the dense neural layer in order to be assigned a predicted label. The selection then factors the relative scores of the images in determining which image to serve in the ad.

in some examples the scores for the images may also factor in the demographics of the target audience.

In further exemplary embodiments, and as depicted in FIG. 10, the server may also suggest image characteristics such as specific text or types of images that are effective for particular demographics. For example, the system may determine that browsers of a brand of athletic wear are especially receptive to images of a runner and/or action phrases and may suggest a showing of more images of runners and/or action phrases. Alternatively, the system may determine that similar browsers are not receptive to images depicting early morning workouts and/or routines and downgrade any images that include sunrises and words dealing with routines.

In these some embodiments, in some examples that the server may create creative advertising based on predictive responsiveness to specific characteristics.

In operation, the computing system can integrate the digital advertisement directly with each one of the platforms in the set of platforms.

in describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components, or steps may be replaced with a single element, component, or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present invention. Further still, other aspects, functions, and advantages such as different combinations of the described embodiments are also within the scope of the present invention.

Figure 13:
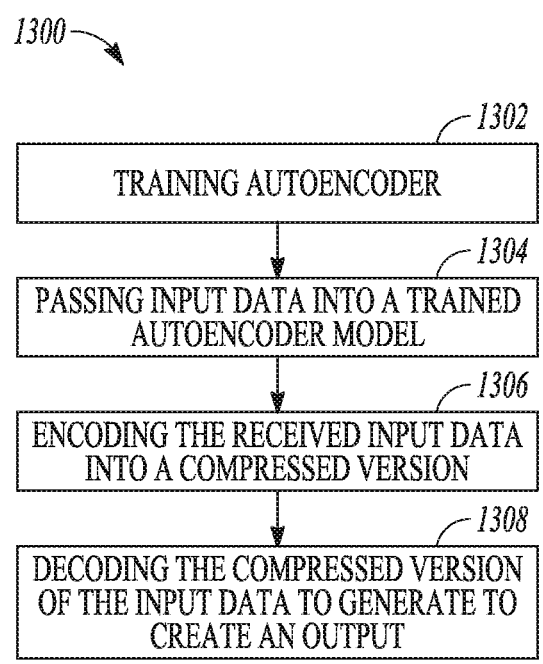
FIG. 13 is a flow chart includes example operations in a method of analyzing images.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts. For example, FIG. 13 includes example operations in a method 1300 of analyzing images. An example method 1300 comprises, at 1302, training an autoencoder using a plurality of image model training samples, the autoencoder comprising a plurality of interconnected layers and combined instances of neural networks; at 1304, passing input data into a trained autoencoder model, the input data including at least one pixel image; at 1306, encoding the received input data into a compressed version of the input data; at 1308, decoding the compressed version of the input data to generate to create an output, the output including a sparse reconstruction of the input data, the output including a predicted pixel image label or score.

In some examples, the method 1300 further comprises reducing a dimensionality of the input data during the encoding operation or the decoding operation.

In some examples, the interconnected layers include an input layer to receive the input data, and an output layer to generate the output, the input layer and the output layer having a same number of nodes.

In some examples, the combined instances of the neural networks include a Restricted Boltzmann Machine (RBM), and wherein training the autoencoder includes training the RBM using contrast divergence.

In some examples, the method 1300 further comprises generating a creative profile including the predicted image label or score.

In some examples, the method 1300 further comprises comparing the predicted pixel image label or score against historical image performance of similar pixel images.

In some examples, a non-transitory' machine-readable medium includes instructions which, when read by a machine, cause the machine to perform operations in a method of analyzing images, the operations comprising those summarized above, or described elsewhere herein.

In some examples, the creative in the winning ad placement is selected based on its predictive effectiveness with the end consumer. In these embodiments, the system may assign a score to available creative images. This creative image score is ideally based on artificial intelligence using training models external to the system and neural network for real-time adjustment.

The invention claimed is:

1. A computerized system for analyzing images, the computerized system comprising:
    at least one programmable processor; and
    a machine-readable medium having instructions stored thereon which, when executed by the at least one programmable processor, cause the at least one programmable processor to execute operations comprising:
    training an autoencoder including a plurality of interconnected layers and combined instances of neural networks, the training comprising:
    identifying a training vector including an encoding of important consumer characteristics of a target audience;
    determining a predicted performance score for multiple pixel images included in a plurality of image model training samples, the image model training samples including the multiple pixel images and historical performance data for each of the multiple pixel images, the predicted performance score based on one or more demographics of the target audience; and optimizing a training model based on a comparison of the predicted performance score to the historical performance data for the multiple pixel images;

preparing input data for a set of available creative images, the input data for each of the available creative images including at least one pixel image and a creative profile including one or more categorical features, numeric features, geographic features, and interest features, the preparing input data including extracting visual features and text features from the at least one pixel image and determining a vector output for each of the one or more categorical features, numeric features, geographic features, and interest features;

parsing the input data for the set of available creative images to select available creative images having one or more of the visual features, text features, categorical features, numeric features, geographic features, and interest features;

using the trained autoencoder, encoding the input data for the selected available creative images to generate a compressed version of the input data that reduces dimensionality of the input data;

decoding the compressed version of the input data to generate an output for each of the available creative images, the output including a sparse reconstruction of the at least one pixel image included in the input data and, a predicted pixel image label or score for the particular available creative image; and serving one of the selected available creative images in an online ad placement based on the predicted pixel image labels or scores for each of the available creative images.

2. The computerized system of claim 1, wherein the operations further comprise,
during the encoding operation or the decoding operation, reducing a dimensionality of the input data passed into the trained autoencoder.

3. The computerized system of claim 1, wherein the interconnected layers include an input layer to receive the input data, and an output layer to generate the output, the input layer and the output layer having a same number of nodes.

4. The computerized system of claim 1, wherein the combined instances of the neural networks include a Restricted Boltzmann Machine (RBM), and wherein training the autoencoder includes training the RBM using contrast divergence.

5. The computerized system of claim 1, wherein the operations further comprise appending the predicted image label or score to the creative profile.

6. The computerized system of claim 1, wherein the operations further comprise comparing the predicted pixel image label or score against historical image performance of similar pixel images.

7. The computerized system of claim 1, wherein the historical performance data includes one or more engagement events observed for users of a target audience that were shown the at least one of the multiple pixel images.

8. A method of analyzing images, the method comprising:
training an autoencoder including a plurality of interconnected layers and combined instances of neural networks, the training comprising:
identifying a training vector including an encoding of important consumer characteristics of a target audience;
determining a predicted performance score for multiple pixel images included in a plurality of image model training samples, the image model training samples including the multiple pixel images and historical performance data for each of the multiple pixel images, the predicted performance score based on one or more demographics of the target audience; and
optimizing a training model based on a comparison of the predicted performance score to the historical performance data for the multiple pixel images;

preparing input data for a set of available creative images, the input data for each of the available creative images including at least one pixel image and a creative profile including one or more categorical features, numeric features, geographic features, and interest features, the preparing input data including extracting visual features and text features from the at least one pixel image and determining a vector output for each of the one or more categorical features, numeric features, geographic features, and interest features;

parsing the input data for the set of available creative images to select available creative images having one or more of the visual features, text features, categorical features, numeric features, geographic features, and interest features;

using the trained autoencoder, encoding the input data for the selected available creative images to generate a compressed version of the input data that reduces dimensionality of the input data;

decoding the compressed version of the input data to generate an output for each of the available creative images, the output including a sparse reconstruction of the at least one pixel image included in the input data and, a predicted pixel image label or score for the particular available creative image; and serving one of the selected available creative images in an online ad placement based on the predicted pixel image labels or scores for each of the available creative images.

9. The method of claim 8, further comprising reducing a dimensionality of the input data during the encoding operation or the decoding operation.

10. The method of claim 8, wherein the interconnected layers include an input layer to receive the input data, and an output layer to generate the output, the input layer and the output layer having a same number of nodes.

11. The method of claim 8, wherein the combined instances of the neural networks include a Restricted Boltzmann Machine (RBM), and wherein training the autoencoder includes training the RBM using contrast divergence.

12. The method of claim 8, further comprising appending the predicted image label or score to the creative profile.

13. The method of claim 8, further comprising comparing the predicted pixel image label or score against historical image performance of similar pixel images.

14. The method of claim 8, wherein the historical performance data includes one or more engagement events observed for users of a target audience that were shown the at least one of the multiple pixel images.

15. A non-transitory machine-readable medium including instructions which, when read by a machine, cause the machine to perform operations in a method of analyzing images, the operations comprising:
training an autoencoder including a plurality of interconnected layers and combined instances of neural networks, the training comprising:
identifying a training vector including an encoding of important consumer characteristics of a target audience;

determining a predicted performance score for multiple pixel images included in a plurality of image model training samples, the image model training samples including the multiple pixel images and historical performance data for each of the multiple pixel images, the predicted performance score based on one or more demographics of the target audience; and optimizing a training model based on a comparison of the predicted performance score to the historical performance data for the multiple pixel images;

preparing input data for a set of available creative images, the input data for each of the available creative images including at least one pixel image and a creative profile including one or more categorical features, numeric features, geographic features, and interest features, the preparing input data including extracting visual features and text features from the at least one pixel image and determining a vector output for each of the one or more categorical features, numeric features, geographic features, and interest features;

parsing the input data for the set of available creative images to select available creative images having one or more of the visual features, text features, categorical features, numeric features, geographic features, and interest features;

using the trained autoencoder, encoding the input data for the selected available creative images to generate a compressed version of the input data that reduces dimensionality of the input data;

decoding the compressed version of the input data to generate an output for each of the available creative images, the output including a sparse reconstruction of the at least one pixel image included in the input data and, a predicted pixel image label or score for the particular available creative image; and serving one of the selected available creative images in an online ad placement based on the predicted pixel image labels or scores for each of the available creative images.

16. The medium of claim 15, wherein the operations further comprise, during the encoding operation or the decoding operation, reducing a dimensionality of the input data passed into the trained autoencoder.

17. The medium of claim 15, wherein the interconnected layers include an input layer to receive the input data, and an output layer to generate the output, the input layer and the output layer having a same number of nodes.

18. The medium of claim 15, wherein the combined instances of the neural networks include a Restricted Boltzmann Machine (RBM), and wherein training the autoencoder includes training the RBM using contrast divergence.

19. The medium of claim 15, wherein the operations further comprise appending the predicted image label or score to the creative profile.

20. The medium of claim 15, wherein the operations further comprise comparing the predicted pixel image label or score against historical image performance of similar pixel images.

* * * * *